E. Y. Robbins,
House Ventilator,
No. 2,297. Reissued June 26, 1866.
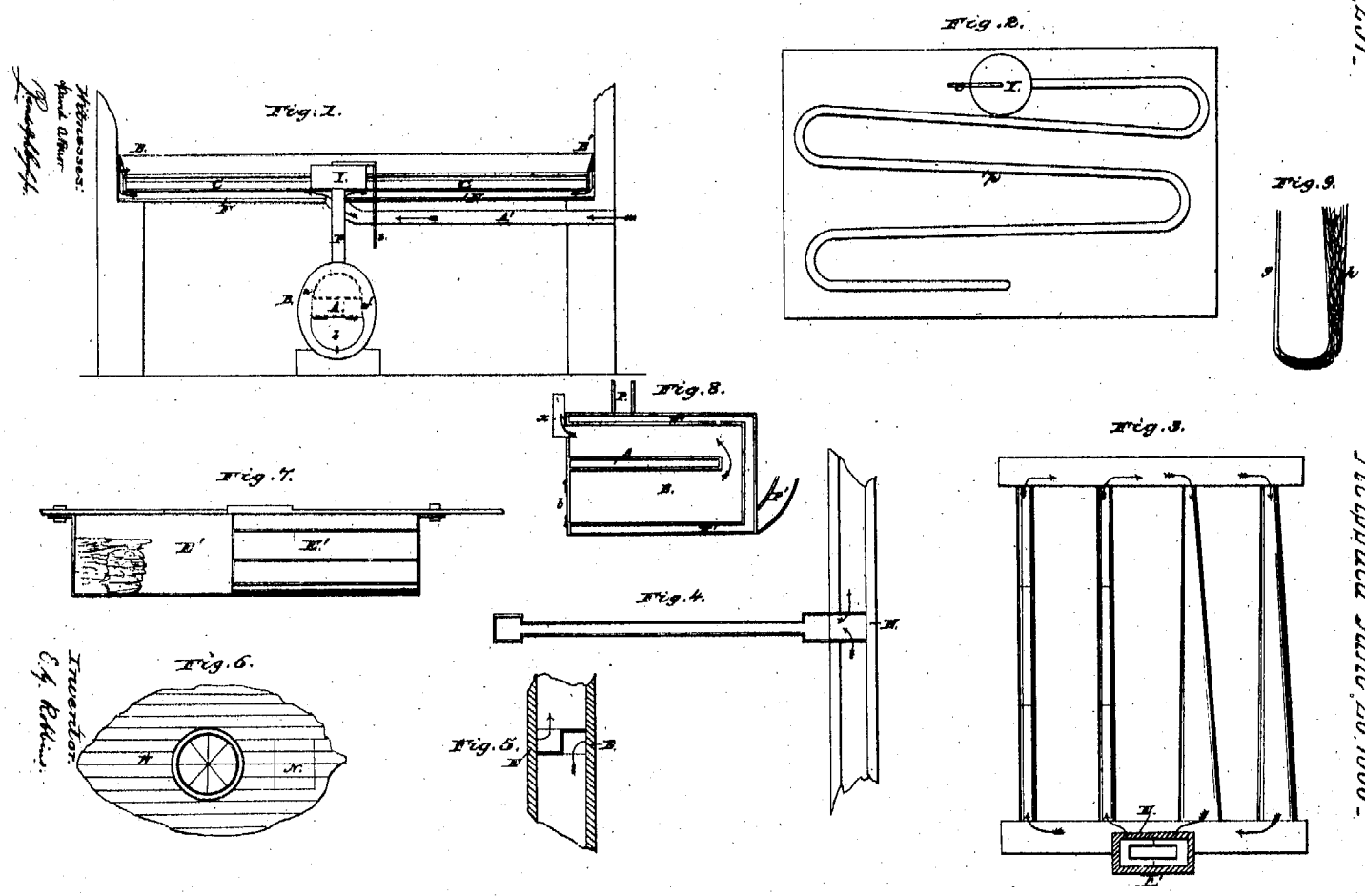

UNITED STATES PATENT OFFICE.

E. Y. ROBBINS, OF CINCINNATI, OHIO.

METHOD OF WARMING AND VENTILATING BUILDINGS.

Specification forming part of Letters Patent No. 35,177, dated May 6, 1862; Reissue No. 2,297, dated June 26, 1866.

*To all whom it may concern:*

Be it known that I, E. Y. ROBBINS, of the city of Cincinnati, county of Hamilton, and State of Ohio, have invented an Improvement in the Method of Warming and Ventilating Dwellings, School-Houses, Churches, Railroad-Cars, &c.; and I hereby declare that the following is a correct and full description thereof, reference being had to the accompanying drawings, which form a part of this specification.

The improvement consists, mainly, in applying the heat to the entire lower part of the room to be warmed, so that it shall be at least as warm at the floor as at the ceiling, in connection with the use of a very large non-metallic warming-surface kept at a low temperature, against which the fresh air afterward to be admitted into the room is made to circulate, so as to warm it only to such a moderate degree that when it enters the room it shall remain in the lower part, where it is wanted for respiration, and not rise at once to the ceiling, as is the case with our present methods of heating. The heat is in general generated below the room or rooms to be warmed, and may be carried up by means of hot water, steam, or hot air, as I do not confine myself to any one medium or agent of conduction. In case of using hot water or steam I make the boiler B, Figures 1 and 8, of a cylindrical or oval cylindrical shape, the fire being everywhere surrounded by a casing of water, W′, Figs. 1 and 8, except in front, where the door *b*, Fig. 8, and smoke-pipe *x* are placed.

B, Fig. 1, represents a front view, and Fig. 8 a longitudinal section, of the boiler. To increase the extent of water-surface exposed to the fire, I place a hollow plate filled with water in the interior of the fire-chamber, which communicates with the water in the side casing, extending back to within a few inches of the back end of the fire-chamber. This plate is shown at A, Fig. 8 and Fig. 1. The fuel being put in at the door *b*, Fig. 8, the flame circulates backward below and forward above said plate, as represented by the arrows.

R, Fig. 1, represents the interior of a room, church, or railroad-car. Immediately below this room, and bounded above by the floor of the room and below by a surface of lath and plaster or other suitable material, is a space, C, Fig. 1, extending under the entire room or the greater part of it, which I call the "hot-air chamber" or "reservoir of heat." This hot-air chamber does not open into the room, and the air in it has no communication with the air in the room, as it is not designed for respiration. This hot-air chamber may be heated either by hot-water pipes or by hot air from a furnace, being thrown into it by the ordinary pipes leading from such furnaces. In this latter case the air must be kept below a burning temperature, or else the floor must be made of non-combustible materials, such as tile, &c. Fig. 2 represents a horizontal section of this hot-air chamber heated by hot-water pipes. The hot water rises through the pipe P, Fig. 8 and Fig. 1, from the top of the boiler, and, flowing into the expansion-tube T, Figs. 1 and 2, passes thence through the coils of pipe *p*, Fig. 2, and returns to the bottom of the boiler through the pipe P′, Fig. 8.

S, Figs. 1 and 2, is a safety-pipe leading from the expansion-tube, to conduct off any steam or an overflow of hot water in case the heat should become too intense. The rising of the water in the expansion-tube may, by means of a float-connection with a rod or chain extending down to the furnace, be made to close a damper, and so check the fire.

The arrangement of the pipes for warming the hot-air chamber, whether containing hot water or steam, may be varied at pleasure. If hot water is used, after being made to circulate through the hot-air chamber, it may be carried back to the bottom of the furnace through a return-pipe as the water returns through the pipe P′, Fig. 8, to the bottom of the boiler, thus causing the same air to circulate continually, and so economizing heat.

If the floor is made of boards, as it may be, when hot water or steam is used for warming there may be placed in the middle of the room, or in any other part of it, a piece of tile-work, W, Fig. 6, of any shape or pattern which may be fancied, in and level with the floor, this piece of tile-work being warmed by a coil of hot-water pipes or steam pipes arranged especially for warming it, said pipes being placed closer together than the pipes under other portions of the floor formed of boards, and the tiles being embedded in mortar resting upon and around said pipes, becoming warmer than the board floor, would be convenient to warm the feet on coming in.

But as the heat from the hot-air chamber or reservoir of heat will not only be conducted upward through the floor, but also downward through its lower boundary, represented by the horizontal line between C and F, Fig. 1, the under surface of this lower boundary is put to a very valuable use as a large non-metallic warming-surface for the purpose of warming to a moderate degree—say from 55° to 65°—the fresh air which is afterward admitted into the room near the floor for respiration. The warmth of the floor itself will correct any want of temperature in this fresh air, while its being at a lower temperature than the body of the air in the room will keep it in the lower part of the room when it is wanted for respiration, and only the vitiated air from the lungs and skin, being lightest, will rise and escape at openings above. The space then represented by F, Fig. 1, between the lower boundary of the hot-air chamber or reservoir of heat and the ordinary ceiling of the room below, is used for what I term the "fresh-air chamber." The fresh air from without, being brought in through an air-duct, (represented by A′, Fig. 1,) enters this fresh-air chamber F from the under side, and, flowing in all directions against the lower boundary of the hot-air chamber, becomes warmed to a moderate temperature, and, rising, enters the room all around the sides a little above the floor through a perforated board, or a slit extending around the room B′, Fig. 1. When it may be thought best the hot-air chamber may be continued upward around the bottom of the walls a foot or two above the floor, or as high as may be found necessary to warm the room. This would probably be found best is school-houses, churches, &c., where many persons are crowded together, requiring a greater amount of ventilation, and, consequently, a greater expenditure of heat. In such case the fresh-air chamber should extend up as high as the hot-air chamber. In such rooms, also, the openings for the admission of fresh air should not only extend around the lower part of the walls, but should also be made under seats, or at other convenient places in the interior of the room. Openings should, of course, be made in or near the ceiling with tubes to conduct away the foul air as it rises. When a large amount of ventilation is required, as in school-houses and other public buildings, some mechanical force, as steam-power, should be used to force in fresh air and drive out the vitiated air, or a wind-wheel with a governor and self-adjustable wings, so that its motion would be nearly uniform whether the winds were rapid or slow, might be cheaply erected to assist ventilation.

The floor of rooms warmed in this manner should be put down in sections or panels with screws N, Fig. 6. At least there should be such panels placed wherever there are joints in the pipes below, so that they may be easily taken up in case of leakage in the pipes.

In cases where it may be preferred to warm the lower rooms or first story by grates or other ordinary method, this system may be applied to the warming of the upper rooms, as follows, using the waste heat from the fire below for that purpose: Within the ordinary brick flue or chimney place a smaller flue of proper shape and size, made of sheet-iron or other suitable material, leaving a space all around between it and the sides of the chimney. A horizontal section of such an arrangement is represented at E, Fig. 3. This channel between the inner smoke-flue and chimney opens below behind the grate into the external atmosphere or other convenient supply of air. This air, becoming heated by contact with the smoke-flue, (up which three-fourths of the heat from an ordinary grate-fire passes,) rises in a current. At or just below the level of the floor of the upper room or second story this ascending current of hot air is obstructed, or rather turned inward, by a plate or diaphragm, E, Fig. 5, (which represents a side view of a chimney so arranged,) and made to circulate through pipes in a hot-air chamber under the floor of this upper room, as shown in Fig. 3, which represents a horizontal section of the chimney and the system of pipes through which the air circulates in the direction of the arrows. The air, returning into the channel in the chimney above the diaphragm E, Fig. 5, again ascends upward. These pipes should be made of different materials and of different shape in their different parts, as hereinafter more fully described, beginning where the air is hottest, in a round pipe of bad conducting qualities, as clay or tin, and ending in a broad flat pipe of good conducting qualities, as sheet-iron, so as to distribute the heat uniformly throughout their length, Fig. 3; or the hot air, being conducted in a pipe or pipes to the part of the hot-air chamber farthest from the chimney, may be allowed to flow out through the whole hot-air chamber as through one broad flue, and so return to the hot-air channel in the chimney. To promote ventilation, openings should be made from the ceilings of the several rooms into this hot-air channel, to carry off the foul air of respiration. Of course a fresh-air chamber should be provided below this hot-air chamber, as before described.

Instead of using hot air, the waste heat of the flue or chimney may be applied to heating water in a coil of pipes all around the sides of the chimney from the grate below up to the floor of the room above, and then circulating through a hot-air chamber, as before described.

In applying this system to the warming of railroad-cars the boiler or furnace should be suspended in a box below the car E′, Fig. 7, with a trap-door opening from the aisle of the car-door into said box, for the purpose of getting down into the box to make the fires, &c. The wood or other fuel should also be placed in this box, so that the dirt will be kept out of the car, a trap-door being made in the bottom or side of the box to throw ashes and dirt out of. Thus the car will be left clean and clear for the occupation of passengers, instead of being occupied by stoves and wood-boxes, which now usually displace about six passengers in each car. Also, by warming a car by this plan passengers will be equally comfortable in every part of the car, and the feet will be kept as warm as the head.

The box for containing the furnace, fuel, &c., should be attached to the bottom of the car by means of links, staples, and bolts, or by screws and nuts, so as to be capable of being removed in summer and again replaced in winter.

The agent for warming a car, as was said of the warming of rooms, may be either hot water, steam, or hot air. In warming cars by hot-air pipes, inasmuch as these pipes, if made of the same material and shape throughout their entire length, would be much hotter near the furnace than at a distance from it, they should be made of different material and of different shape in their different parts, beginning at the furnace in a round tin or double pipe, *g*, Fig. 9, changing at some distance from the furnace into a round sheet-iron pipe, and gradually flattening near the end of the car. It should return in a broad flat sheet-iron flue, *h*, Fig. 9, so that the heat shall be distributed as nearly as possible uniformly throughout the entire length of the pipe. Thus the bottom of the car will be warmed equally throughout its entire length. The fresh air, being brought down in pipes from the top of the car and made to enter at several places along under the center of the car, between the lower floor or ceiling under the joists at the bottom of the car and the lower boundary of the hot-air chamber, circulates against the latter, and, becoming slightly warmed, enters at numerous openings along the sides of the car near the floor, as before described in case of the room R, Fig. 1, the foul air passing out through the usual openings at the top of the car.

What I claim as my invention, and desire to secure by Letters Patent, is—

1. The arrangement of the hot-air chamber or reservoir of heat for warming the floor and lower part of the walls, in connection with the arrangement for the introduction at the bottom of the room of moderately-warmed fresh air which has not been in contact with the hot metallic surface either of hot-water pipes or steam pipes, or of a stove or furnace, or any other highly-heated surface, substantially as above set forth.

2. The fresh-air chamber F, Fig. 1, under the hot-air chamber C, Fig. 1, and under the reservoir of heat formed by the pipes, mortar, &c., of the radiator W, Fig. 6, all substantially as set forth.

3. In case of warming the upper rooms by the waste heat of the fire in the lower story, the arrangement of an inner smoke-flue within the brick flue or chimney E, Fig. 3, and the diaphragm F, Fig. 5, for turning the current of hot air rising between this inner smoke-flue and the sides of the chimney inward under the floor of the upper room for warming it, or any equivalent device, substantially as set forth.

4. In using hot-air pipes for warming cars or rooms, the making of said pipes in their different parts of different materials and of different shapes, so that their conducting and radiating power shall increase as the distance from the furnace or source of heat increases, and as the temperature of the air within them decreases, so that they shall distribute the heat as nearly uniformly as possible throughout their entire length, substantially as above set forth.

5. The horizontal radiator W, Fig. 6, formed of tiles, mortar, cement, or other similar material, which has acquired or will acquire a sufficient degree of hardness, placed in and forming a part of the floor, in combination with the arrangement for heating it by hot-water pipes or steam-pipes placed under the tiles or other material of which said radiator may be formed.

In testimony whereof I have signed my name to this specification before two subscribing witnesses.

E. Y. ROBBINS.

Witnesses:
JNO. R. HUNTER,
GEO. W. HOLMES.